United States Patent Office

2,787,609
Patented Apr. 2, 1957

2,787,609

POLYMERIZATION OF BUTADIENE HYDROCARBONS IN THE PRESENCE OF AN ARYLALKYL SELENOL

Bailey Bennett, Columbus, Ohio, assignor, by mesne assignments, to the United States of America as represented by the Secretary of the Army No Drawing. Application February 25, 1954,
Serial No. 412,626

10 Claims. (Cl. 260—82.3)

This invention relates to the polymerization of butadiene hydrocarbons and mixtures of butadiene hydrocarbons with copolymerizable vinyl compounds in aqueous emulsion in the presence of selenol compounds.

In the past it has been the practice to use mercaptans as modifiers in elastomer formation. This process is illustrated, for example, by the disclosure in U. S. Patent No. 2,281,613 to Wollthan et al. However, such prior art processes using mercaptans have certain well-known disadvantages, as enumerated below, which the present invention is intended to overcome.

There is disclosed and claimed in copending application Serial No. 342,715, filed March 16, 1953, now U. S. Patent 2,737,507, a process and a new composition of matter produced by the polymerization of butadiene hydrocarbons and mixtures of butadiene hydrocarbons with copolymerizable vinyl compounds in aqueous emulsion in the presence of aliphatic selenol compounds. This invention relates to the use of arylalkyl selenol compounds for the same purpose.

A disadvantage of the mercaptans is that the mercaptans were developed for use in emulsion polymerization systems at 50° C. If it is desired to carry out emulsion polymerizations at high temperatures, such as up to 150° C., the mercaptans are not well adapted for use as modifiers. The activity of mercaptans is relatively great at high polymerization temperatures, with the mercaptan being consumed too rapidly to satisfactorily modify and regulate the elastomer polymerization.

Another disadvantage of the mercaptans is a lack of control over the formation rate of the elastomers at high polymerization temperatures.

Still another disadvantage is that an oil-resistant elastomer polymerized in the presence of a mercaptan at low temperature when compounded into a rubberlike material would not exhibit the optimum balance of oil-resistance and low-temperature properties. For example, it is well known in the art that if the rubberlike material should have a high oil resistance, the low-temperature properties would be poor; on the other hand, if the low-temperature properties were good, the oil resistance of the compounded rubber would be poor.

Still another disadvantage is that the mercaptans are not satisfactory for use in continuous polymerization processes carried out at high temperatures. A satisfactory continuous polymerization process requires rapid conversion to the elastomer, with proper modification thereof, and a modifier that will remain active for the duration of the continuous polymerization process. Mercaptans are too reactive at the higher temperature and overmodify the polymer. Further, mercaptans are too rapidly consumed at high temperatures and thus the reaction will die out if the amount of mercaptan used is lessened so as to avoid overmodification of the polymer.

Therefore, it is an object of this invention to provide a new and useful method of modifying or regulating synthetic elastomers at temperatures not greater than 150° C.

Still another object of the invention is to provide a method of control over the formation of synthetic elastomers at high polymerization temperatures.

Another object of the invention is to provide a synthetic oil-resistant elastomer that, when compounded into a rubberlike material will exhibit the optimum balance of oil-resistance and low-temperature properties.

Another object of this invention is to provide a synthetic elastomer which contains selenium as an integral part thereof.

Still another object of the invention is to provide a method of continuous high-temperature polymerization. In the practice of this invention, modifier action is possible at the high temperature required for the successful operation of a continuous polymerization process.

Other objects and advantages of the present invention will be apparent in view of the following detailed disclosure and description thereof.

The present invention relates to the process, and the product produced thereby, of polymerizing a material selected from the group consisting of 1,3-butadiene hydrocarbons and mixtures of 1,3-butadiene hydrocarbons with copolymerizable compounds having a single C=C double linkage in aqueous emulsion in the presence of selenols of the arylalkyl type, having at least two carbon atoms in the alkyl group.

The arylalkyl selenols are those compounds containing at least two and not more than 16 carbon atoms in the alkyl group, and can be expressed by the following general formula:

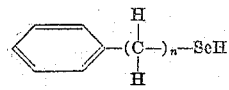

where $n$ is any integer between 1 and 17.

The selenols behave in a manner similar to that of mercaptans in emulsion polymerization but with reduced activity at any given polymerization temperature.

The following examples are submitted for the purpose of illustrating the present invention and are not to be construed as limiting or restricting it thereto. In all examples the proportions are given in parts by weight.

EXAMPLE I

A copolymer of butadiene-acrylonitrile was obtained at a polymerization temperature of 120° C. with a polymerization time of 4.0 hours by the addition to 180 parts of water of 10 parts of soap (P & G SF flakes manufactured by Procter and Gamble, Cincinnati, Ohio), 0.6 parts of potassium chloride and 0.1 parts of potassium persulfate; to the aqueous phase were added 35 parts of acrylonitrile, 4 parts of phenyl ethyl selenol, and 65 parts of butadiene. Chemical analysis of the elastomer produced thereby indicated 2.8 percent elemental selenium as integral part thereof.

EXAMPLE II

A copolymer of butadiene-acrylonitrile was obtained in the same manner as Example I, except that the modifier was phenyl propyl selenol, 4 parts, and the polymerization time was 2.0 hours.

EXAMPLE III

A copolymer of butadiene-acrylonitrile was obtained in the same manner as Example I, except that the modifier was phenyl butyl selenol, 2 parts, and the polymerization time was 2.5 hours.

EXAMPLE IV

A copolymer of butadiene-styrene was obtained at a polymerization temperature of 120° C. with a polymerization time of 4.0 hours by the addition to 180 parts of water of 10 parts of soap (P & G SF flakes manufactured by Procter and Gamble, Cincinnati, Ohio), 0.6 parts of potassium chloride and 0.1 parts of potassium persulfate; to the aqueous phase were added 25 parts of styrene, 4 parts of phenyl ethyl selenol, and 75 parts of butadiene.

EXAMPLE V

A copolymer of butadiene-acrylonitrile was obtained at a polymerization temperature of 90° C. with a polymerization time of 4.0 hours by the addition to 180 parts of water of 3 parts of soap (P & G SF flakes manufactured by Procter and Gamble, Cincinnati, Ohio), 0.6 parts of potassium chloride, and 0.002 parts of potassium persulfate; to the aqueous phase were added 35 parts of acrylonitrile, 2 parts of phenyl ethyl selenol, and 65 parts of butadiene.

EXAMPLE VI

Copolymers obtained by Example I were compounded into a rubberlike material in a standard test recipe consisting of 100 parts of copolymer, 40 parts of carbon black (Statex B, distributed by the Binney and Smith Company, New York City, New York), 5 parts zinc oxide, 1.25 parts sulfur, and 1.75 parts of rubber accelerator (Altax, manufactured by the R. T. Vanderbilt Company, New York City, New York).

The use of arylalkyl selenols is particularly adapted to polymerization at relatively high temperatures where the usual modifying agents, the mercaptans, are consumed very rapidly. The lower order of activity of the selenols makes them particularly well adapted for use at high temperatures.

Another advantage is that the reduced activity at higher temperatures of the selenols enables elastomers of superior properties to be obtained as, for example, the favorable balance of oil-resistance and low-temperature properties of a butadiene-acrylonitrile copolymer.

Table I illustrates that a butadiene-acrylonitrile copolymer produced by the practice of this invention will exhibit a slight decrease in the conversion of monomers to copolymers, but also a significant decrease in gel content as the amount of selenol present is increased with time and temperature remaining constant. The data set forth in Table I were obtained with elastomers prepared as per Example I except that the selenol was varied from 0 to 4 parts, by weight.

*Table I*

| Parts by Weight of Phenyl Ethyl Selenol | Conversion, Percent | Gel Content, Percent |
|---|---|---|
| 0.0 | 53.6 | 83.6 |
| 1.0 | 51.0 | 81.3 |
| 2.0 | 49.2 | 75.3 |
| 4.0 | 44.0 | 51.9 |

These data indicate the desirability of using arylalkyl selenols for high temperature polymerization because of the modifier or regulator activity which may be obtained by the use thereof.

High temperature emulsion polymerization is desirable and advantageous in certain instances, as, for example, enhancing certain properties of the elastomer so prepared. Of particular importance are the properties of oil-resistant, rubberlike materials relating to the balance of oil-resistance and low-temperature properties. By carrying out the emulsion polymerization in the presence of the selenols disclosed herein, an oil-resistant elastomer may be obtained, which, when compounded, will show very favorable oil-resistance properties and at the same time have extremely good low-temperature properties. In the prior art utilizing mercaptans at low polymerization temperatures, it was necessary to sacrifice one property to obtain the other. By high-temperature polymerization in the presence of the selenols disclosed herein, both the oil-resistance properties and low-temperature properties of the elastomer will be extremely favorable with little or no sacrifice of one property to obtain the other.

In the experimental production of butadiene-acrylonitrile elastomers, polymerized in the presence of an arylalkyl selenol, it is evident that the favorable balance of oil-resistance and low-temperature properties of such elastomers is promoted by the increase in polymerization temperature. The synthetic elastomers prepared by the new processes have been shown to be superior in the balance of oil-resistance and low-temperature properties to that of similar elastomers which have been prepared with mercaptans.

This favorable balance of properties in butadiene-acrylonitrile type elastomers is possible, due solely to the use of selenols disclosed herein and elastomer modification obtained thereby.

To illustrate this new, novel, and surprising balance of oil-resistance and low-temperature properties, a test was made on elastomers prepared in Example I and compounded into a rubberlike material as per Example VI.

(1) Oil-resistance properties (expressed in terms of percent swell on twenty-four hour immersion in reference fuel No. 2). Selenol-modified elastomer, 73.1 percent.

(2) TR–70 low-temperature properties (expressed as the percent retraction at a particular temperature, that is, the temperature at which 70 percent retraction is obtained). The TR–70 value indicates serviceability of an elastomer after long exposure to low temperature.

Selenol-modified elastomer, minus 26° C.

Thus, it may be readily seen that an arylalkyl selenol-modified elastomer, when compounded into a rubberlike material, presents a favorable balance of oil-resistance and low-temperature properties.

A further advantage is that the arylalkyl selenols possess regulator or modifier activity, a property which makes them available for the continuous rapid production of synthetic elastomers at high temperatures in emulsion systems. Such regulator or modifier activity may be obtained by the use of selenols at emulsion polymerization temperatures in excess of 120° C. This property would enable this polymerization system to be used in the continuous high-temperature polymerization process such as might be carried out in a tube or pipe through which emulsions flow continuously. In such a process, rapid conversion coupled with good modification would be desirable. The materials necessary for obtaining such activity, of necessity have to possess modifier or regulator activity.

While the particular embodiments of the invention have been shown and described, it will be obvious to those skilled in the art that various changes and modifications may be made without departing from the invention in its broader aspects and, therefore, the appended claims are intended to cover all such changes and modifications as fall within the true spirit and scope of the invention. Further, it is understood that the invention is not to be limited to the specific form, or compositions, or temperatures herein described and shown.

What is claimed is:

1. The process which comprises polymerizing a material selected from the group consisting of 1,3-butadiene hydrocarbons and mixtures of 1,3-butadiene hydrocarbons with copolymerizable compounds having a single C=C linkage, in aqueous emulsion at a temperature of at least 90° C. in the presence of phenyl alkyl selenols having at least two but not more than 16 carbon atoms in the alkyl group.

2. The process according to claim 1 wherein the copolymerizable compound is acrylonitrile.

3. The process according to claim 1 wherein the copolymerizable compound is styrene.

4. The process according to claim 1 wherein the selenol is a phenyl ethyl selenol.

5. The process according to claim 1 wherein the selenol is phenyl propyl selenol.

6. The process of polymerizing a 1,3-butadiene hydrocarbon in emulsion in water with an emulsifying agent, a polymerizing initiator, a comonomer and a phenyl alkyl selenol having at least two but not more than 16 carbon atoms in the alkyl group, wherein the polymerization is carried out at a temperature of at least 90° C.

7. The process according to claim 6 wherein the comonomer is acrylonitrile.

8. The process according to claim 6 wherein the comonomer is styrene.

9. The process which comprises polymerizing a material selected from the group consisting of 1,3-butadiene hydrocarbon and mixtures of 1,3-butadiene hydrocarbons with copolymerizable compounds having a single C=C linkage in aqueous emulsion at a temperature of from 90° C. to 150° C. in the presence of a phenyl alkyl selenol having at least two but not more than 16 carbon atoms in the alkyl group.

10. The process of polymerizing a 1,3-butadiene hydrocarbon in emulsion in water with an emulsifying agent, a polymerizing initiator, a comonomer and a phenyl alkyl selenol having at least two but not more than 16 carbon atoms in the alkyl group, wherein the polymerization is carried out at a temperature of from about 90° C. to about 150° C.

References Cited in the file of this patent
UNITED STATES PATENTS 2,281,613    Wollthan et al. _____ May 5, 1942